Oct. 11, 1966  C. G. SCHNEIDER  3,277,927
BELLOWS
Filed July 26, 1963
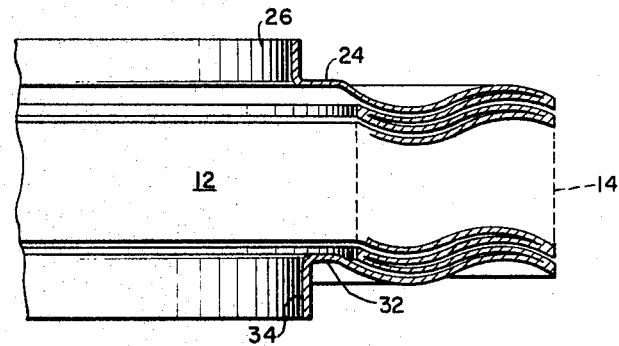
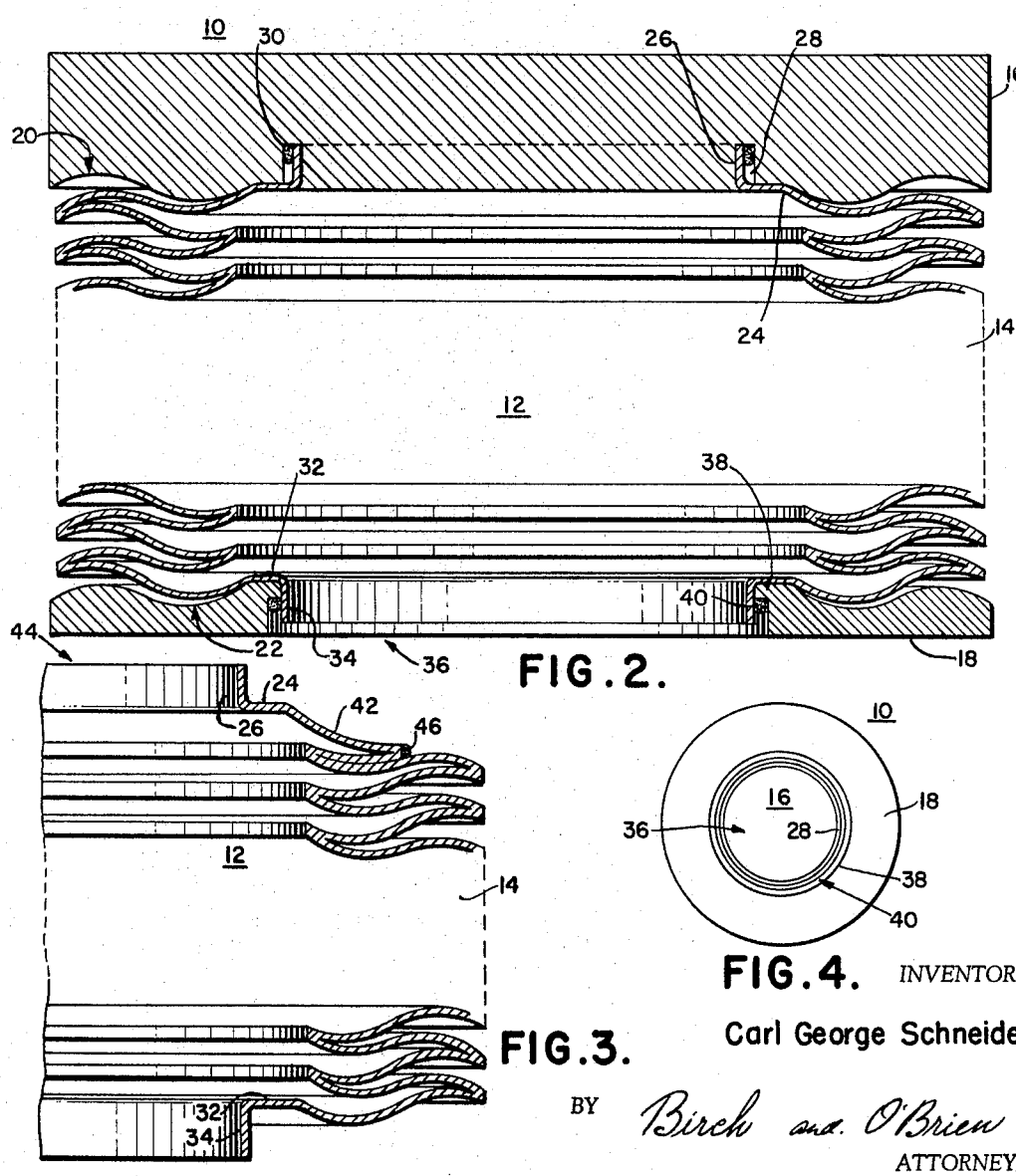
INVENTOR
Carl George Schneider
BY *Birch and O'Brien*
ATTORNEYS

United States Patent Office 3,277,927
Patented Oct. 11, 1966

3,277,927
BELLOWS
Carl George Schneider, Milford, Conn., assignor to Robertshaw Controls Company, Richmond, Va., a corporation of Delaware
Filed July 26, 1963, Ser. No. 298,528
8 Claims. (Cl. 138—121)

This invention relates to bellows and more particularly to a novel bellows structure having high strength and a high degree of stability.

It is an object of this invention to provide a bellows structure having novel cooperating end fittings and nested annular body folds, the said end fittings being adapted to effect the forming of the said nested annular body folds.

It is another object of this invention to provide a bellows with seamless nested annular body folds having a stable free length.

Another object of this invention is to provide a novel bellows structure wherein the body portion of the bellows will not deform under high external or internal pressure differentials when in a nested solid condition.

Still another object of this invention is to provide a bellows structure wherein the body portion comprises a plurality of nested unitary uniform annular folds completely obviating the use of soldered or welded joints between the said annular folds.

Yet another object of this invention is to provide a bellows structure including means to effect a positive and precise alignment of the end fittings and body portion thereof.

Still another object of this invention is to provide a novel bellows structure with nested annular body folds that has uniform spacing between folds at free length and which will maintain substantially uniform spacing between folds while collapsing to the next solid height.

Yet another object of this invention is to provide novel methods for fabricating and forming a bellows structure.

These and other objects of the invention will become more fully apparent with reference to the following specifications and drawing which relate to preferred embodiments of the invention.

In the drawing:

FIG. 1 is a diametric partial cross-section of the cylindrical body portion of the invention with the body folds thereof in a nested solid position;

FIG. 2 is a diametric full cross-section of one embodiment of the bellows of the present invention with the end fittings in place and the cylindrical body portion in an extended position;

FIG. 3 is a diametric partial cross-section of a second embodiment of the cylindrical body portion of the invention in an extended position; and FIG. 4 is a bottom end view of the embodiment of FIG. 2.

Referring in detail to the drawing, and more particularly to FIGS. 1, 2 and 4, one embodiment of the bellows of the present invention will now be described.

The expansible body portion of the bellows 10 comprises a hollow cylindrical body member 12, vertically expansible as shown, having horizontally disposed accordian type annular body folds 14 distributed vertically along the body member 12.

The annular body folds 14, in diametric cross-section, are of devious shapes and as specifically shown are of a substantially sinusoidal shape, adjacent folds being nested, in full surface contact, one within the other when the body member 12 is in the solid height or unexpanded position shown in FIG. 1. The annular body folds 14 are all formed such that there are no joints at the apices of the annular folds by a method to be hereinafter described.

The body member 12 is provided with top and bottom end fittings 16 and 18, respectively, generally comprising circular metal plates of substantial thickness and having identical outside diameters which are slightly greater than that of the body member 12 when it is in a solid height position.

The inside faces of the top and bottom end fittings 16 and 18 are provided, adjacent their outer peripheries, with milled, or otherwise formed, die surfaces 20 and 22, respectively. The top and bottom die surfaces 20 and 22, in diametric cross-section, are each of a substantially sinusoidal shape and have interfitting complementary curvatures both with respect to each other and the respective annular body folds 14 immediately adjacent thereto. The spans of the die surfaces, however, are slightly greater than that of the annular folds for purposes of stability and strength.

The uppermost of the annular body folds 14 has a flat horizontal integral annular extension or integral upper shoulder 24 which extends radially inward of the annular folds 14. A vertical annular flange 26 is integrally formed on the innermost periphery of the horizontal shoulder 24.

A vertically cut annular groove or channel 28 is provided in the inner face of the top end fitting 16 internally concentric with the upper die surface 20. The annular channel 28 is dimensioned to receive the vertical flange 26 on the upper shoulder 24 of the body member 12. The flange 26 is held in the upper channel 24 by means of a solder joint 30 or the like within the said channel.

The lowermost of the annular body folds 14 is also provided with an integral inwardly and horizontally extending lower shoulder 32 which has an integral dependent vertically flange 34 on its inner periphery.

The bottom end fitting 18 is bored out internally and circumferentially of the lower die surface 22 to provide a pressure inlet port 36. The innermost peripheral edge of the port 36 is provided with an annular over-hang or boss 38 which is dimensioned to be juxtaposed with the outer periphery of the dependent vertical flange 34 on the lower body shoulder 32. A solder joint 40 or the like is provided between the boss 38 and the dependent flange 34 to retain the bottom end fitting 18 on the body member 12.

Both the upper solder joint 30 and the lower solder joint 40 are positioned within the body portion 12 on a lesser radius than the inner diameter of the annular body folds 14. Thus, no joints are made between the end fittings 16 and 18 and the body portion 12 within the span of the annular body folds 14.

Referring now to FIG. 3, the annular body folds 14, lower body shoulder 32 and its integral dependent vertical flange 34 are identical to those elements of FIGS. 1, 2 and 4 bearing like numerals. Also, the upper body shoulder 24 and its integral vertical flange 26 are identical to those elements of FIGS. 1, 2 and 4 bearing like numerals. However, in the body portion 12, the uppermost annular body fold comprises an annular fold 42 having substantially one-half the span of the rest of the annular folds 14. The lower surface portion of the uppermost fold 42 is integral with the other annular folds 14 while the upper surface portion is integral with the upper body shoulder 24, this latter combination, along with the vertical flange 26, comprising an upper body assembly 44 which is attached to the body poriton 12 by an arc weld at the outer peripheral apex 46 of the uppermost annular fold 42.

The end fittings 16 and 18 are used with this embodiment of the body portion 12 in the manner shown in FIG. 2.

*The method*

In fabricating the bellows illustrated in FIG. 2, the body portion 12 is first formed hydraulically, or by other conventional tube upsetting methods, from a smooth cylindrical tube, to form a series of integral annular body folds having substantially U-shaped cross-sections, the upper and lower body shoulders 24 and 32 and their respective integral vertical flanges 26 and 34 being formed in the same or an immediately subsequent operation by conventional methods such as spinning or stamping.

The top and bottom end fittings 16 and 18 are milled or cast to form the first and second die surfaces 20 and 22, respectively, and are next secured to the body portion 12 by forming the upper and lower solder joints 30 and 40, respectively.

The bellows 10 now being fully assembled, the substantially sinusoidal cross-section of the annular body folds 14 is effected by imparting opposing forces to the outer faces of the top and bottom end fittings 16 and 18, respectively, whereby the complementary curvatures of the upper and lower die surfaces 20 and 22, respectively, are imposed upon the annular body folds 14. Thus, the body folds 14 are constrained to assume the substantially sinusoidal cross-sectional shape defined by the curvatures of the said die surfaces and remain set with this shape.

As to the embodiment of FIG. 3, once the weld at the apex 46 of the uppermost annular fold 42 has been made, subsequent to the initial upsetting of the body portion 12, the same method as to soldering and die-forming of the body folds applies.

An alternative method of assembly comprises forming the sinuous annular body folds 14 with complementary die surfaces (not shown) prior to the assembly of the body portion 10 to the end fittings 16 and 18. Thus, the complementary die surfaces 20 and 22 are only to effect the complete solid height condition of the bellows 10 in this method of fabrication.

*Operation*

Referring to FIGS. 1, 2 and 4, assuming that the lower end fitting 18 is in fixed position and pressure is admitted to the body portion 12 via the inlet port 36 in the said lower end fitting 18, vertical expansion of the bellows 10 in an amount determined by the spring rate of the body portion 12 and the magnitude of the pressure will occur.

Initially, the bellows is in the solid height or collapsed position of FIG. 1, in which the annular body folds 14 are all juxtaposed in nested condition with each other and the die surfaces 20 and 22, respectively, of the top and bottom end fittings 16 and 18. In this condition the span of the annular folds 14 is equivalent to a solid pipe or tube wall and will withstand extreme overpressures in comparison to the pressure rating of the bellows when expanded to the maximum free length of its operating stroke.

The cross-sectional shape of the annular folds 14 retain a high lateral rigidity in all operating positions and preclude the occurrence of "oil canning" in the body member 12 at rated operating pressures.

The internal position of the upper and lower solder joints 30 and 40, respectively, provides a simple high strength pressure seal, which is outside of the span of the annular body folds 14.

The upper body shoulder 24 and flange 26 and the lower body shoulder 32 and flange 34, cooperating with the top and bottom end fittings 16 and 18, respectively, provide integral indexing means for the bellows 10 whereby proper alignment of the body member 12 is provided upon contraction and reshaping of the annular folds 14 thereof.

As can be seen from the foregoing specification and drawing, this invention provides a new and novel bellows assembly having a minimum number of unit parts and assembly steps, resulting in a cheaper bellows structure that is capable of high external or internal pressure differentials when in a nested solid height.

It is to be understood that the specific embodiments of the invention shown and described herein are for the purpose of example only and are not intended to limit the scope of the appended claims.

What is claimed is:
1. A bellows comprising an expansible unitary hollow body member including a plurality of nested annular body folds with the span thereof having a devious cross-section; first and second end fittings comprising first and second circular plates attached, respectively, to opposite ends of said body member; first and second annular die surfaces, respectively, integral with the opposing faces of said plates and substantially coextensive with the span of said body folds, said die surfaces having a devious cross-sectional curvature complementary with each other and with said body folds; first and second integral inward extensions of said body member adjacent said first and second end fittings, respectively; and first and second mounting means, respectively, on said first and second end fittings, internally concentric, respectively, with said first and second die surfaces, joined with said first and second extensions, respectively, and thereby forming seals for both ends of said body member out of and internally concentric with the said span of said annular body folds.

2. The invention defined in claim 1, wherein said first and second integral extensions each comprise a radial annular shoulder having an integral annular flange thereon extending longitudinally outward from said body member; said first mounting means comprising an annular channel internally concentric with said first die surface in the face of said first end fitting and receiving said annular flange of said first integral extension of said body member; and said second mounting means comprises an axial bore in said second end fitting internally concentric of said second die surface and an annular boss about the periphery of inner end of said bore in circumventing juxtaposition with said annular flange of said second integral extension of said body member.

3. The invention defined in claim 1, wherein said unitary hollow body member further includes an end body fold adjacent said first end fitting having a span substantially one-half that of the other of said annular body folds and said die surfaces, comprising an inner fold surface unitary with the rest of said body member and an end fold surface unitary with said first inward integral extension, said inner and end fold surfaces being integrally united at their outer peripheries to define the outer apex of said end body fold, said apex being within the span of said other annular body folds and said die surfaces.

4. The invention defined in claim 1, wherein the outside diameters of said first and second end fittings are identical and greater than the outside diameter of said body member.

5. The invention defined in claim 1, wherein the spans of said first and second die surfaces are identical and greater than the span of said annular body folds.

6. The method of fabricating a bellows to effect annular body folds of devious cross-section, said bellows finally comprising a cylindrical body member having first and second end fittings in the form of cylindrical plates attached, respectively, to opposite ends thereof and said body member being previously deformed to effect annular body folds therein each having a span with a substantially U-shaped cross-section, comprising the steps of forming annular die surfaces, of complementary devious cross-sectional curvatures, on the opposing faces of said end fittings, with spans substantially equal to the span of said annular folds; securing said end fittings to said body member with the spans of said die surfaces in registry with the span of said annular folds; and longitudinally compressing said body member between said end fittings to constrain said annular folds, over their span, to assume the devious cross-sectional curvatures of said die surfaces.

7. The method of fabricating a bellows to effect annular body folds of devious cross-section, said bellows finally comprising a cylindrical body member having first and second end fittings in the form of cylindrical plates attached, respectively, to opposite ends thereof and said body member being previously deformed to effect annular body folds therein each having a span with a substantially U-shaped cross-section, comprising the steps of forming annular die surfaces, of complementary devious cross-sectional curvatures, on the opposing faces of said end fittings, with spans substantially equal to the span of said annular folds; further forming said annular folds such that said folds are constrained, over their span to assume the devious cross-sectional curvatures of said die surfaces; and securing said end fittings to said body member with the spans of said die surfaces in registry with the span of said annular folds.

8. A bellows comprising an expansible unitary hollow body member including a plurality of nested annular body folds with the span thereof having a sinuous cross-section; first and second end fittings comprising first and second circular plates attached, respectively, to opposite ends of said body member; first and second annular die surfaces, respectively, integral with the opposing faces of said plates and substantially coextensive with the span of said body folds, said die surfaces having a sinuous cross-sectional curvature complementary with each other and with said body folds; first and second integral inward extensions of said body member adjacent said first and second end fittings, respectively; and first and second mounting means, respectively, on said first and second end fittings, internally concentric, respectively, with said first and second die surfaces, joined with said first and second extensions, respectively, and thereby forming seals for both ends of said body member out of and internally concentric with the said span of said annular body folds.

References Cited by the Examiner

UNITED STATES PATENTS

| | | | |
|---|---|---|---|
| 2,616,728 | 11/1952 | Pitt | 138—121 X |
| 2,682,893 | 7/1954 | Ziebold | 92—45 X |
| 2,699,959 | 1/1955 | Zallea | 138—121 |

LAVERNE D. GEIGER, *Primary Examiner.*

T. MOORHEAD, *Assistant Examiner.*